United States Patent [19]

Shiell et al.

[11] Patent Number: 5,903,742

[45] Date of Patent: May 11, 1999

[54] METHOD AND CIRCUIT FOR REDEFINING BITS IN A CONTROL REGISTER

[75] Inventors: Jonathan H. Shiell, Plano; Donald E. Steiss, Richardson, both of Tex.

[73] Assignee: Texas Instruments Incorporated, Dallas, Tex.

[21] Appl. No.: 08/739,594

[22] Filed: Oct. 30, 1996

[51] Int. Cl.[6] .............................. G06F 3/00; G06F 3/42; G06F 9/00

[52] U.S. Cl. .......................... 395/500; 395/561; 364/130; 365/189.07

[58] Field of Search ............................... 395/800.01, 500, 395/701, 561; 364/130; 365/189.07

[56] References Cited

U.S. PATENT DOCUMENTS

| | | | |
|---|---|---|---|
| 4,771,405 | 9/1988 | Burch et al. | 365/189.07 |
| 4,876,639 | 10/1989 | Mensch, Jr. | 395/500 |
| 4,954,988 | 9/1990 | Robb | 365/189.02 |
| 5,201,043 | 4/1993 | Crawford et al. | 395/185.02 |
| 5,426,767 | 6/1995 | Crosswy | 395/500 |
| 5,450,608 | 9/1995 | Steele | 395/800.01 |
| 5,490,267 | 2/1996 | Crosswy | 395/500 |
| 5,535,404 | 7/1996 | Tsubota | 395/385 |
| 5,729,760 | 3/1998 | Poisner | 395/823 |

FOREIGN PATENT DOCUMENTS 2 270 176   8/1993   United Kingdom .

*Primary Examiner*—Alyssa H. Bowler
*Assistant Examiner*—Nabil El-Hady
*Attorney, Agent, or Firm*—Robert D. Marshall, Jr.; James C. Kesterson; Richard L. Donaldson

[57] ABSTRACT

A microprocessor includes a control register having a predetermined bit which is unconditionally writable to either a first state or a second state. Additional bits of the control register are writable to either the first or second state when the predetermined bit has the first state. Each additional bit is not writable when the predetermined bit has the second state. The microprocessor further includes at least one circuit controlled by the state of a corresponding one of the additional bits of the control register. The writability of the additional bits is preferably further conditioned upon the state of a machine status register, which is unconditionally writable to either the first state or the second state. A primary AND gate and a secondary AND gate corresponding to each additional bit control the writability of the additional bits. The secondary AND gates may further condition the writability of the corresponding additional bit on the state of a secondary machine status register, the current privilege level or other microprocessor status signals or plural additional inputs. Each bit of the control register is written into a corresponding bit of the shadow register upon writing the second state into the machine status register.

8 Claims, 2 Drawing Sheets

METHOD AND CIRCUIT FOR REDEFINING BITS IN A CONTROL REGISTER

TECHNICAL FIELD OF THE INVENTION

The technical field of this invention is control registers in microprocessors.

BACKGROUND OF THE INVENTION

It is known in the art to differentiate between microprocessors of the same family via whether a control register bit is both readable and writable. In particular, it is possible to distinguish between various generations of the Intel x86 family of microprocessors (including the 8086, 80286, 80386, 80486, Pentium and Pentium Pro microprocessors) using this technique. U.S. Pat. No. 5,426,767 METHOD FOR DISTINGUISHING BETWEEN A 386-TYPE CENTRAL PROCESSING UNIT AND A 286-TYPE CENTRAL PROCESSING UNIT issued Feb. 6, 1996 discloses a method to determine if a particular microprocessor is an Intel 80286 or an Intel 80386. This method detects whether bits 12, 13 and 14 of the EFLAGS register may be set to "1". The method generally includes: a write to the EFLAGS register with bits 12, 13, and 14 of the write data set to "111"; a read of the EFLAGS register; and an examination of bits 12, 13, and 14. In an Intel 80286, these bits cannot be set to "1" but are always read as "0". Thus if these bits are "0", the microprocessor is a 80286. In an Intel 80386, these bits may be written set to "1" via a register write instruction. In subsequent reads of the EFLAGS register, these bits would be read as "1". Thus if these bits are read as "1", then the microprocessor is a 80386.

Intel has a practice of employing more bits of the EFLAGS register with each new generation of microprocessors in this family. Thus the new generation of microprocessor changes particular bits from nonwritable/readable only as "0" to both readable and writable as compared with the prior generation. In some cases the particular EFLAGS bits are used for expanded functions in the higher generation. In other cases, the mere fact that a particular bit in the EFLAGS register is both readable and writable indicates that some other expanded function is available in the higher generation. This is the case for the CPUID instruction as disclosed in UK published patent application GB 2,270,176 A entitled "IDENTIFYING A COMPUTER MICROPROCESSOR." Therefore in general, it is possible to distinguish between adjacent pairs of processor generations in the Intel x86 family by whether particular bits of the EFLAGS register are both readable and writable. Independent software developers writing programs for computers using the Intel x86 family of microprocessors typically employ a series of such EFLAGS bits tests to determine the generation of a particular microprocessor within the family. This permits the independent software developer to select between program modules based upon the detected generation. Thus programs may be written to take advantage of features of later generations of the microprocessor family, which are presumably more powerful, and switch to alternate presumably less powerful code for earlier generations without the later added feature. This permits compatibility with plural generations of the microprocessor family while employing more powerful features of later generations.

Recently the possibility of construction of a single chip microprocessor with patchable microcode has become feasible. Thus the possible functions of the microprocessor need not be fixed upon manufacture. U.S. Provisional Patent Application Ser. No. 60/013,043 entitled SINGLE CHIP MICROPROCESSOR CIRCUITS, SYSTEMS, AND METHODS FOR SELF-LOADING PATCH MICRO-OPERATION CODES AND PATCH MICROINSTRUCTION CODES and U.S. Provisional Patent Application Ser. No. 60/013,058 entitled MICROPROCESSOR WITH CIRCUITS, SYSTEMS, AND METHODS FOR OPERATING WITH PATCH MICRO-OPERATION CODES AND PATCH MICROINSTRUCTION CODES STORED IN MULTI-PURPOSE MEMORY STRUCTURE, both filed Mar. 8, 1996, disclose a single chip microprocessor in which external systems enable microcode patches. These microcode patches enable change of the functionality of the microprocessor after manufacture. Such microcode patches may be used to correct bugs in the original microprocessor after manufacture even in the possession of the end user. Such bugs include erroneous or anomalous operations produced by errors in the original design. One infamous example of such a bug is the erroneous operation of the floating point divide instruction in response to some data patterns in the Intel Pentium microprocessor. These microcode patches may also be used to add functionality to the microprocessor after manufacture. Depending upon the particular added feature, this microcode patch technique may be capable of adding additional features first implemented by Intel in later generations of the microprocessor family. However, software produced by independent software developers may not be able to take advantage of this microcode patch. Programs developed to take advantage of the new feature would ordinarily check the newly read/writable EFLAGS bit of that generation of microprocessors to determine if the particular microprocessor is of a generation that supports this new feature. An older generation microprocessor with the new feature implemented in patched microcode would fail this test. Thus the independently developed program would not use the new feature implemented in patched microcode because it would not realize the microprocessor supports the new feature.

SUMMARY OF THE INVENTION

A microprocessor includes a control register having N bits. The control register includes a predetermined bit which is unconditionally writable to either a first or a second state. The control register further includes at least one additional bit to the predetermined bit. Each additional bit of the control register is writable to either the first state or second state when the first predetermined bit has the first state. Each additional bit is not writable when the first predetermined bit has the second state. The microprocessor further includes at least one circuit controlled by the state of a corresponding one of the additional bits of the control register. The writability of the additional bits is preferably further conditioned upon the state of a machine status register, which is unconditionally writable to either the first state or the second state.

Plural AND gates control the writability of the additional bits of the control register. A primary AND gate has a first input connected to the first predetermined bit, a second input connected to the machine status register. Each additional bit has a corresponding secondary AND gate. The secondary AND gate corresponding to each additional bit has a first input connected to the output of the primary AND gate and a second input receiving a corresponding bit of write data. The output of each secondary AND gate is connected to an input of the corresponding additional bit. Thus the secondary AND gate controls the writability of its corresponding additional bit by controlling the supplied write signal. The secondary AND gates may have additional inputs to further condition the writability of the corresponding additional bit on the state of a secondary machine status register, the current privilege level or other microprocessor status signals. The secondary AND gate may have plural additional inputs to further condition the writability of the corresponding additional bit on more than one additional signal.

The microprocessor preferably further includes a shadow register having N bits. Each bit of the shadow register is connected to a corresponding of bit of the control register. Each bit of the control register is written into the corresponding bit of the shadow register upon writing the second state into the machine status register.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
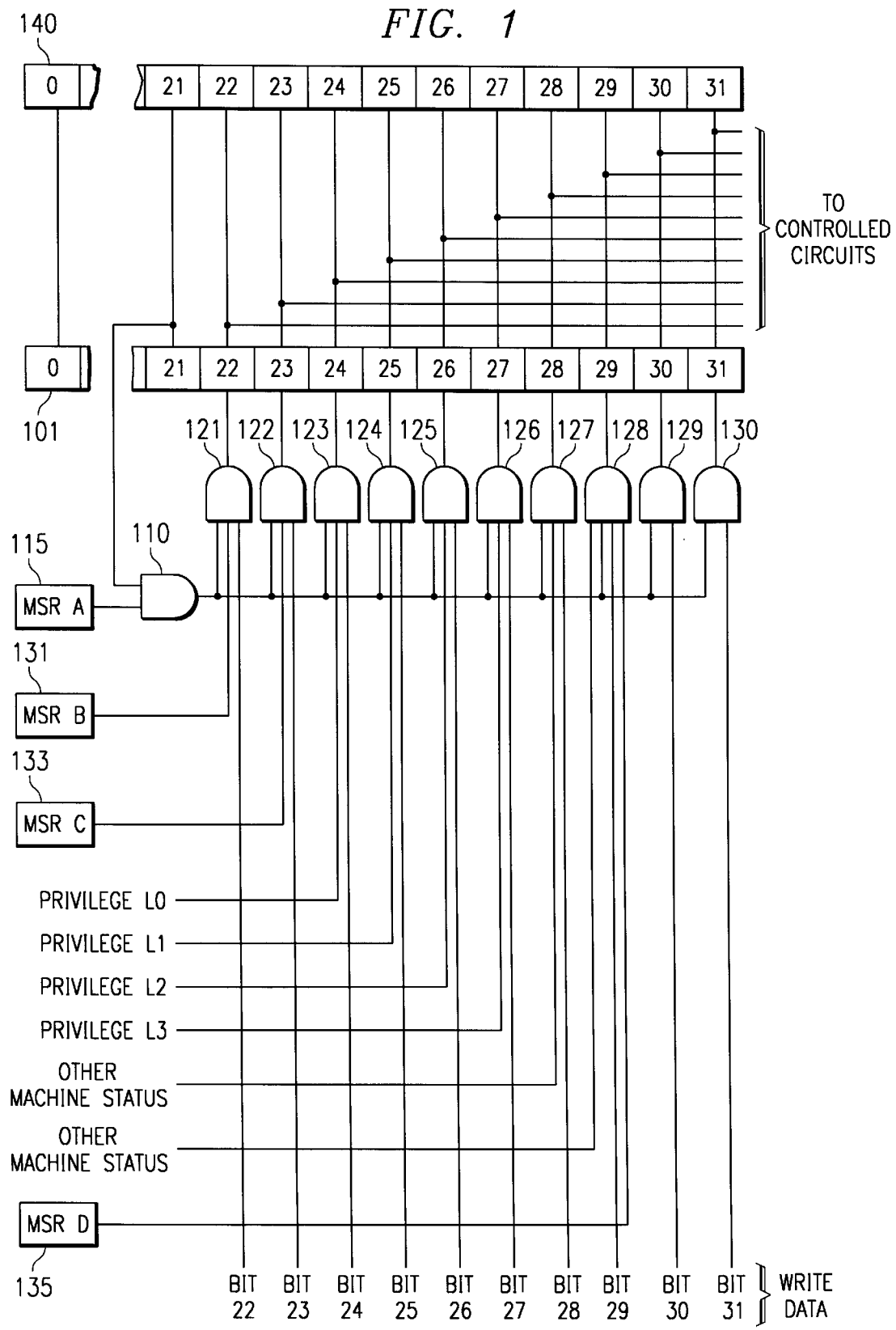
FIG. 1 illustrates in block diagram form the EFLAGS register and the auxiliary circuits of a preferred embodiment of this invention.

FIG. 1 illustrates an embodiment of this invention including EFLAGS register 101. The EFLAGS register 101 includes 32 bits designated 0 to 31. FIG. 1 illustrates bits 0 and 21 to 31 of EFLAGS register 101. The connections of bits 0 to 20 are in accordance with the prior art and are not illustrated in detail. These bits 0 to 20 may be written to and read from as normal in the x86 processors of the Pentium generation. Reading from bits 21 to 31 is conventional and not illustrated in FIG. 1. Writing to bits 21 to 31 is altered in accordance with this invention. In summary, all writes to bits 22 to 31 are conditional upon the status of EFLAGS bits 21 and the status of machine status register A 115. If the proper status is detected, any of bits 22 to 31 may be written into with "1" or "0".

Bit 21 of EFLAGS register 101 is both readable and writable with conventional EFLAGS register instructions. In this invention, writing to bit 21 of EFLAGS register 101 may be accomplished at all privilege levels. The state of bit 21 of EFLAGS register 101 is coupled to one input of AND gate 110. A second input of AND gate 110 receives the status of machine status register A 115. Machine status register A 115 may be written into with a machine status write instruction and may be read from with a machine status read instruction designating this machine status register. The output of AND gate 110 is supplied to one input of each of the AND gates 121, 122, 123, 124, 125, 126, 127, 128, 129 and 130. The AND gates 121, 122, 123, 124, 125, 126, 127, 128, 129 and 130 receive the write data for bits 22, 23, 24, 25, 26, 27, 28, 29, 30 and 31, respectively. Accordingly, bits 22, 23, 24, 25, 26, 27, 28, 29, 30 and 31 may not be written into unless both bit 21 is "1" and the status of machine status register A 115 is "1".

In accordance with this invention, all bits of EFLAGS register 101 and the status of machine status register A 115 are set to "0" upon initial application of electrical power to the microprocessor and upon RESET. Initially, then bits 22, 23, 24, 25, 26, 27, 28, 29, 30 and 31 are readable as "0" and are not writable. This status corresponds to the status of the respective bits of the EFLAGS register in the Pentium generation of x86 microprocessors. At some later time following initial application of electric power, the basic input/output system (BIOS) or the operating system may change both bit 21 and the status of machine status register A 115 to "1" permitting bits 22 to 31 to be writable.

Writing into bits 22 to 31 may be further conditioned upon other machine states. FIG. 1 illustrates several examples of this further conditioning. These examples are intended to be illustrative and are neither required nor exhaustive of the possible further conditioning. The AND gate 121, which controls writing into bit 22, receives the status of machine status register B 131 on a third input. Thus bit 22 may only be written to if bit 21 is "1", and the status of both machine status register B 131 are "1". If any of these are "0", bit 22 may not be written to. Likewise, AND gate 122, which controls writing into bit 23, receives the status of machine status register C 133 on a third input. Thus writing into bit 23 is also controlled by the status of machine status register C 133. As previously stated with regard to machine status register 115, either machine status register B 131 or machine status register C 133 may be written into with a machine status write instruction and read from with a machine status read instruction designating one of these machine status registers.

FIG. 1 illustrates that writing into EFLAGS register 101 bits 24, 25, 26 and 27 are conditioned upon the privilege level of the currently executing code. FIG. 1 illustrates that AND gate 123, controlling the writing into bit 24, receives a Privilege L0 signal on a third input. Thus bit 24 may only be written into by program code having a privilege level of L0. Similarly, AND gates 124, 125 and 126, controlling writing into EFLAGS register 101 bits 25, 26 and 27 respectively, receive the Privilege L1, L2 and L3 signals, respectively. In accordance with the prior x86 art, Privilege L0 is the highest privilege level employed by the operating system or supervisor. Privilege L3 is the lowest privilege level and is ordinarily employed by applications programs. The microprocessor must have these privilege level signals because certain actions are restricted based upon the privilege level of the currently executing program code. Thus the writability of bits of EFLAGS register 101 may be conditioned upon the current privilege level.

FIG. 1 illustrates that writing into EFLAGS register 101 bits 28 and 29 are conditioned upon the other machine status. FIG. 1 illustrates that AND gate 127, controlling the writing into bit 28, receives an "other machine status" signal on a third input. Thus bit 28 may only be written into when this other machine status is "1". FIG. 1 illustrates AND gate 128, controlling the writing into bit 29, receives an "other machine status" signal on a third input and the status of machine status register D 135 on a fourth input. Thus writing into is further conditioned upon this "other machine status" signal and the status of machine status register D 135. As previously stated, machine status register D 135 may be written into with a machine status write instruction and read from with a machine status read instruction designating this machine status register. This example indicates that writing into one of EFLAGS register 101 may be further conditioned upon plural further conditions. Any combination of machine status or microprocessor state may form the further conditions.

FIG. 1 illustrates AND gate 129, controlling writing into bit 30, and AND gate 130, controlling writing into bit 31. In the case of bits 30 and 31, there are no other conditioning inputs. Thus bits 30 and 31 may be written into if bit 21 is "1" and the state of machine status register A 115 is also "1".

FIG. 1 illustrates the outputs of EFLAGS register 101 bits 22 to 31 connected to "controlled circuits." The particular controlled circuits are not important to the present invention. However, an example will be noted. One or more of the bits 22 to 31 could be employed to select whether a cache internal to the microprocessor employs cache line fetches of 64 bytes or of 32 bytes. This selection could be enabled by BIOS code to match the width of the external bus. These signals could also be passed to microsequencer 248 (FIG. 2) to enable branch decisions in microcode. This would permit enabling patched microcode based upon the state of the one or more of the EFLAGS register 101 bits 22 to 31.

FIG. 1 further illustrates shadow register 140. In an embodiment of this invention, clearing machine status register A 115 also causes the state of EFLAGS register 101 to be written into shadow register 140. Clearing machine status register A 115 also freezes the state of EFLAGS register 101.

Figure 2:
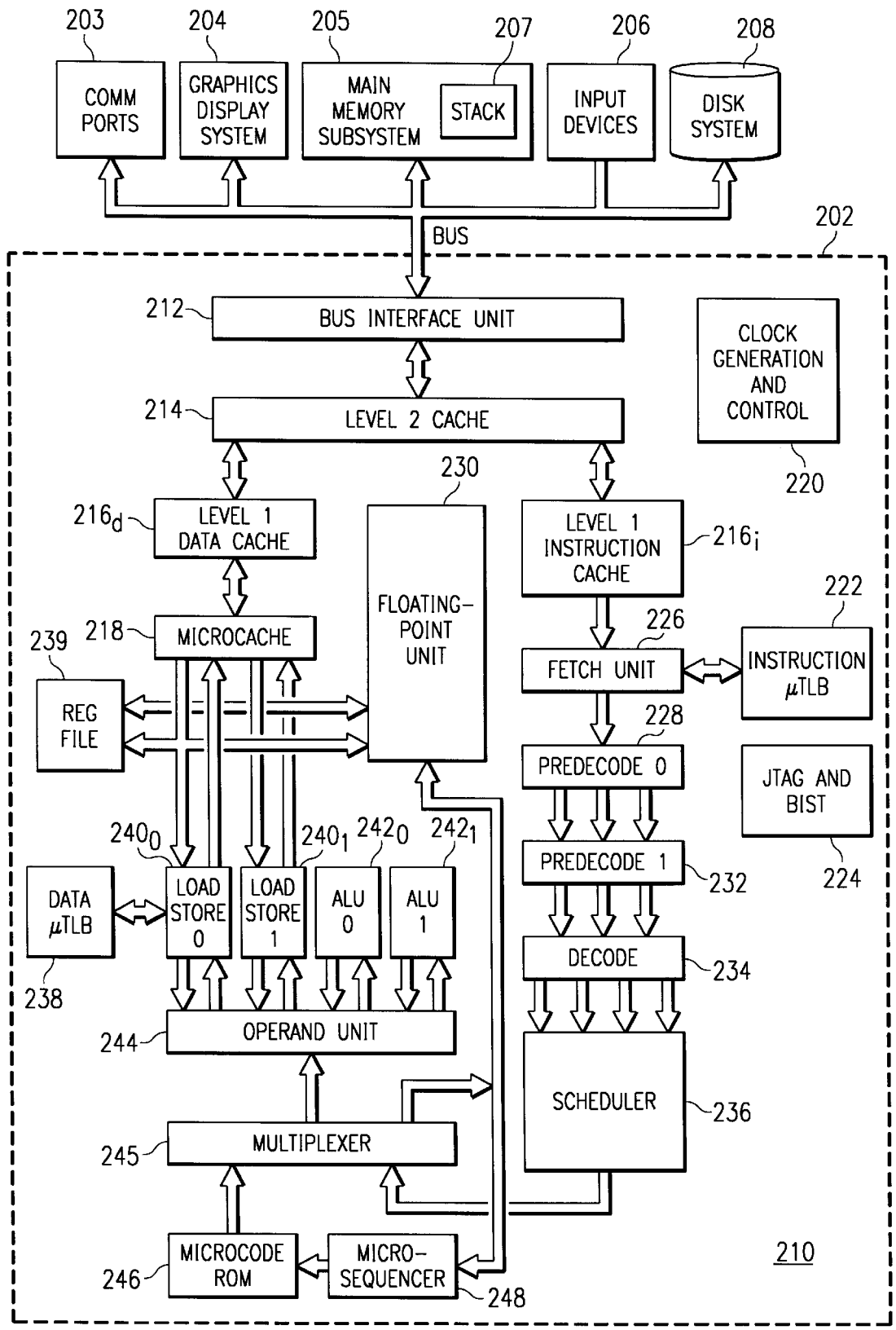
FIG. 2 illustrates in block diagram form an exemplary data processing system within which the preferred embodiments may be implemented.

FIG. 2 illustrates a block diagram of a microprocessor embodiment into which the embodiments Of this invention may be incorporated. Referring now to FIG. 2, an exemplary data processing system 202, including an exemplary superscalar pipelined microprocessor 210 within which the preferred embodiment is implemented, will be described. It is to be understood that the architecture of system 202 and of microprocessor 210 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 210, as shown in FIG. 2, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 202 contains such conventional subsystems as communication ports 203 (including modem ports and modems, network interfaces, and the like), graphics display system 204 (including video memory, video processors, a graphics monitor), main memory system 205 which is typically implemented by way of dynamic random access memory (DRAM) and includes a stack 207, input devices 206 (including keyboard, a pointing device, and the interface circuitry therefor), and disk system 208 (which may include hard disk drives, floppy disk drives, and CD-ROM drives). It is therefore contemplated that system 202 of FIG. 2 corresponds to a conventional desktop computer or workstation, as are now common in the art. Of course, other system implementations of microprocessor 210 can also benefit from the present embodiments, as will be recognized by those of ordinary skill in the art.

Microprocessor 210 includes a bus interface unit (BIU) 212 that is connected to bus B, and which controls and effects communication between microprocessor 210 and the other elements in system 202. BIU 212 includes the appropriate control and clock circuitry to perform this function, including write buffers for increasing the speed of operation, and including timing circuitry so as to synchronize the results of internal microprocessor operation with bus B timing constraints. Microprocessor 210 also includes clock generation and control circuitry 220 which, in this exemplary microprocessor 210, generates internal clock phases based upon the bus clock from bus B; the frequency of the internal clock phases, in this example, may be selectably programmed as a multiple of the frequency of the bus clock.

As is evident in FIG. 2, microprocessor 210 has three levels of internal cache memory, with the highest of these as level 2 cache 214, which is connected to BIU 212. In this example, level 2 cache 214 is a unified cache, and is configured to receive all cacheable data and cacheable instructions from bus B via BIU 212, such that much of the bus traffic presented by microprocessor 210 is accomplished via level 2 cache 214, Of course, microprocessor 210 may also effect bus traffic around cache 214, by treating certain bus reads and writes as "not cacheable." Level 2 cache, 214, as shown in FIG. 2, is connected to two level 1 caches 216; level 1 data cache $216_d$ is dedicated to data, while level 1 instruction cache $216_i$ is dedicated to instructions. Power consumption by microprocessor 210 is minimized by only accessing level 2 cache 214 only in the event of cache misses of the appropriate one of the level 1 caches 216. Furthermore, on the data side, microcache 218 is provided as a level 0 cache, which in this example is a fully dual-ported cache.

As shown in FIG. 2 and as noted hereinabove, microprocessor 210 is of the superscalar type. In this example multiple execution units are provided within microprocessor 210, allowing up to four instructions to be simultaneously executed in parallel for a single instruction pointer entry. These execution units include two ALUs $244_0$, $244_2$ for processing conditional branch, integer, and logical operations, floating-point unit (FPU) 230, two load-store units $240_0$, $240_1$, -and microsequencer 248. The two load-store units 240 utilize the two ports to microcache 218, for true parallel access thereto, and also perform load and store operations to registers in register file 239. Data microtranslation lookaside buffer ($\mu$TLB) 238 is provided to translate logical data addresses into physical addresses, in the conventional manner.

These multiple execution units are controlled by way of multiple pipelines with seven stages each, with write back. The pipeline stages are as follows:

F Fetch: This stage generates the instruction address and reads the instruction from the instruction cache or memory PD0 Predecode stage 0: This stage determines the length and starting position of up to three fetched x86-type instructions PD1 Predecode stage 1: This stage extracts the x86 instruction bytes and recodes them into fixed length format for decode DC Decode: This stage translates the x86 instructions into atomic operations (AOps)

SC Schedule: This stage assigns up to four AOps to the appropriate execution units OP Operand: This stage retrieves the register operands indicated by the AOps EX Execute: This stage runs the execution units according to the AOps and the retrieved operands WB Write back: This stage stores the results of the execution in registers or in memory Referring back to FIG. 2, the pipeline stages noted above are performed by various functional blocks within microprocessor 210. Fetch unit 226 generates instruction addresses from the instruction pointer, by way of instruction micro-translation lookaside buffer ($\mu$TLB) 222, which translates the logical instruction address to a physical address in the conventional way, for application to level 1 instruction cache $216_i$. Instruction cache $216_i$ produces a stream of instruction data to fetch unit 226, which in turn provides the instruction code to the predecode stages in the desired sequence. Speculative execution is primarily controlled by fetch unit 226, in a manner to be described in further detail hereinbelow.

Predecoding of the instructions is broken into two parts in microprocessor 210, namely predecode 0 stage 228 and predecode 1 stage 232. These two stages operate as separate pipeline stages, and together operate to locate up to three x86 instructions and apply the same to decoder 234. As such, the predecode stage of the pipeline in microprocessor 210 is three instructions wide. Predecode 0 unit 228, as noted above, determines the size and position of as many as three x86 instructions (which, of course, are variable length), and as such consists of three instruction recognizers; predecode 1 unit 232 recodes the multi-byte instructions into a fixed-length format, to facilitate decoding.

Decode unit 234, in this example, contains four instruction decoders, each capable of receiving a fixed length x86 instruction from predecode 1 unit 232 and producing from one to three atomic operations (AOps); AOps are substantially equivalent to RISC instructions. Three of the four decoders operate in parallel, placing up to nine AOps into the decode queue at the output of decode unit 234 to await scheduling; the fourth decoder is reserved for special cases. Scheduler 236 reads up to four AOps from the decode queue at the output of decode unit 234, and assigns these AOps to the appropriate execution units. In addition, the operand unit 244 receives and prepares the operands for execution, As indicated in FIG. 2, operand unit 244 receives an input from scheduler 236 and also from microcode ROM 248, via multiplexer 245, and fetches register operands for use in the execution of the instructions. In addition, according to this example, operand unit 244 performs operand forwarding to send results to registers that are ready to be stored, and also performs address generation for AOps of the load and store type.

Microsequencer 248, in combination with microcode ROM 246, control ALUs 242 and load/store units 240 in the execution of microcode entry AOps, which are generally the last AOps to execute in a cycle. In this example, microsequencer 248 sequences through microinstructions stored in microcode ROM 246 to effect this control for those microcoded microinstructions. Examples of microcoded microinstructions include, for microprocessor 210, complex or rarely-used x86 instructions, x86 instructions that modify segment or control registers, handling of exceptions and interrupts, and multi-cycle instructions (such as REP instructions, and instructions that PUSH and POP all registers).

Microprocessor 210 also includes circuitry 224 for controlling the operation of JTAG scan testing, and of certain built-in self-test functions, ensuring the validity of the operation of microprocessor 210 upon completion of manufacturing, and upon resets and other events.

What is claimed is:

1. A microprocessor comprising:
   a control register having N bits including
      a first predetermined bit unconditionally writable to either a first state or a second state;
      at least one additional bit connected to said predetermined bit and writable to either said first state or said second state when said first predetermined bit has said first state and not writable when said first predetermined bit has said second state; and
   at least one circuit controlled by said state of a corresponding one of said at least one additional bit of register.

2. The microprocessor of claim 1, further comprising:
   a machine status register unconditionally writable to either a first state or a second state; and
   said least one additional bit of register further connected to said machine status register and writable to either said first state or said second state when both said first predetermined bit has said first state and said machine status register has said first state and not writable when either said first predetermined bit has said second state or said machine status register has said second state.

3. The microprocessor of claim 2, further comprising:
   a primary AND gate having a first input connected to said first predetermined bit, a second input connected to said machine status register and an output; and
   a secondary AND gate corresponding to each additional bit having a first input connected to said output of said primary AND gate, a second input receiving a corresponding bit of write data for said control register and an output connected to an input of said corresponding additional bit.

4. The microprocessor of claim 3, wherein:
   said secondary AND gate corresponding to at least one of said additional bit including a third input; and
   said improvement further comprises a secondary machine status register supplying an input signal to said third input of a corresponding secondary AND gate, said secondary machine status register unconditionally writable to either a first state or a second state, thereby said least one additional bit of register writable to either said first state or said second state when all of said first predetermined bit has said first state, said machine status register has said first state and said secondary machine status register has said first state and not writable when either said first predetermined bit has said second state, said machine status register has said second state or said secondary machine status register has said second state.

5. The microprocessor of claim 3, wherein:
   said secondary AND gate corresponding to at least one of said additional bit including a third input; and
   said improvement further comprises supplying a privilege level signal indicating a privilege level of program code currently executing in the microprocessor to said third input of a corresponding secondary AND gate, thereby said least one additional bit of register writable to either said first state or said second state when both said first predetermined bit has said first state, said machine status register has said first state and said privilege level signal indicates a predetermined privilege level and not writable when either said first predetermined bit has said second state, said machine status register has said second state or said privilege level signal indicates a privilege level other than said predetermined privilege level.

6. The microprocessor of claim 3, wherein:
   said secondary AND gate corresponding to at least one of said additional bit including a third input; and
   said improvement further comprises a machine status signal supplying said third input of a corresponding secondary AND gate, said machine status signal having either a first state or a second state, thereby said least one additional bit of register writable to either said first state or said second state when all of said first predetermined bit has said first state, said machine status register has said first state and said machine status signal has said first state and not writable when either said first predetermined bit has said second state, said machine status register has said second state or said machine status signal has said second state.

7. The microprocessor of claim 3, wherein:
   said secondary AND gate corresponding to at least one of said additional bit including a third input and a fourth input; and said improvement further comprises a secondary machine status register supplying an input signal to said third input of a corresponding secondary AND gate, said secondary machine status register unconditionally writable to either a first state or a second state, and a machine status signal supplying said fourth input of said corresponding secondary AND gate, said machine status signal having either a first state or a second state, thereby said least one additional bit of register writable to either said first state or said second state when all of said first predetermined bit has said first state, said machine status register has said first state, said secondary machine status register has said first state, and said machine status signal has said first state and not writable when either said first predetermined bit has said second state, said machine status register has said second state, said secondary machine status register has said second state or said machine status signal has said second state.

8. The microprocessor of claim 3, further comprising:

a shadow register having N bits, each bit connected to a corresponding of bit of said control register, said state stored in each bit of said control register written into said corresponding bit of said shadow register upon writing said second state into said machine status register.

\* \* \* \* \*